(12) United States Patent
Reinhart

(10) Patent No.: US 8,287,390 B2
(45) Date of Patent: Oct. 16, 2012

(54) DAMPER ASSEMBLY WITH ENGINE-SIDE COVER PLATE DIRECTLY CONNECTED TO ENGINE CRANKSHAFT AND POWERTRAIN HAVING SAME

(75) Inventor: Timothy J. Reinhart, Brownsburg, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 210 days.

(21) Appl. No.: 12/821,200

(22) Filed: Jun. 23, 2010

(65) Prior Publication Data

US 2011/0315501 A1    Dec. 29, 2011

(51) Int. Cl.
*F16F 15/121* (2006.01)
(52) U.S. Cl. ........................................ 464/68.1; 464/180
(58) Field of Classification Search .................. 464/68.1, 464/180; 60/338; 74/411
See application file for complete search history.

(56) References Cited

U.S. PATENT DOCUMENTS

| 2,995,909 | A | * | 8/1961 | Russey ........................ 464/68.1 |
| 5,323,665 | A | | 6/1994 | Rediker, Jr. |
| 5,761,970 | A | * | 6/1998 | Bonfilio .................. 464/68.1 X |
| 6,299,541 | B1 | * | 10/2001 | Bertin et al. |

FOREIGN PATENT DOCUMENTS

| DE | 3712876 C2 | 4/2000 |
| DE | 19919621 A1 | 11/2000 |
| DE | 102004016760 A1 | 10/2005 |

* cited by examiner

*Primary Examiner* — Gregory Binda
(74) *Attorney, Agent, or Firm* — Quinn Law Group, PLLC

(57) ABSTRACT

The powertrain includes an engine having a crankshaft, and a transmission having a transmission input member. A damper assembly is included that has an engine-side cover plate facing the engine, a transmission-side cover plate facing the transmission, and a retaining member between the cover plates. Resilient members are positioned between the engine-side cover plate and the transmission-side cover plate and supported by the retaining member. The engine-side cover plate is directly connected to the crankshaft for common rotation therewith.

16 Claims, 2 Drawing Sheets

DAMPER ASSEMBLY WITH ENGINE-SIDE COVER PLATE DIRECTLY CONNECTED TO ENGINE CRANKSHAFT AND POWERTRAIN HAVING SAME

TECHNICAL FIELD

The invention relates to a damper assembly for a vehicle powertrain.

BACKGROUND

Conventional vehicle powertrains having only a combustion engine as a power source typically have a flywheel mounted to the engine crankshaft. In an automatic transmission, a flexplate is connected to the flywheel and forms a starter ring gear. The flexplate connects to a torque converter that contains an internal damper assembly that is submerged in oil. Hybrid powertrains may not need a starter ring gear because a hybrid powertrain may have one or more motor/generators that may be used to start the engine. A flexplate with a ring gear may still be included in order to allow the engine to be started for compliance testing during production. In a manual transmission, torque converters are not used, and a flywheel that has starter ring gear teeth is typically used in place of a flexplate.

SUMMARY

A powertrain with a damper assembly is provided that has neither a flywheel nor a flexplate, thus reducing the axial packaging size of the damper assembly, allowing the overall axial length of the powertrain to be decreased. The powertrain includes an engine having a crankshaft, and a transmission having a transmission input member. The powertrain may be a hybrid powertrain, having another source of power, such as one or more motor/generators, in addition to the engine. A damper assembly is included that has an engine-side cover plate facing the engine, a transmission-side cover plate facing the transmission, and a retaining member between the cover plates. Resilient members are positioned between the engine-side cover plate and the transmission-side cover plate and supported by the retaining member. The engine-side cover plate is directly connected to the crankshaft for common rotation therewith. At least one generally-annular weighted member may be connected to the engine-side cover plate. The generally-annular weighted member has teeth at an outer perimeter to form a ring gear that may be used for starting the engine. Because the weighted member forms the ring gear, the gear teeth are thicker in an axial direction than if formed by a flexplate or by the engine-side cover plate.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
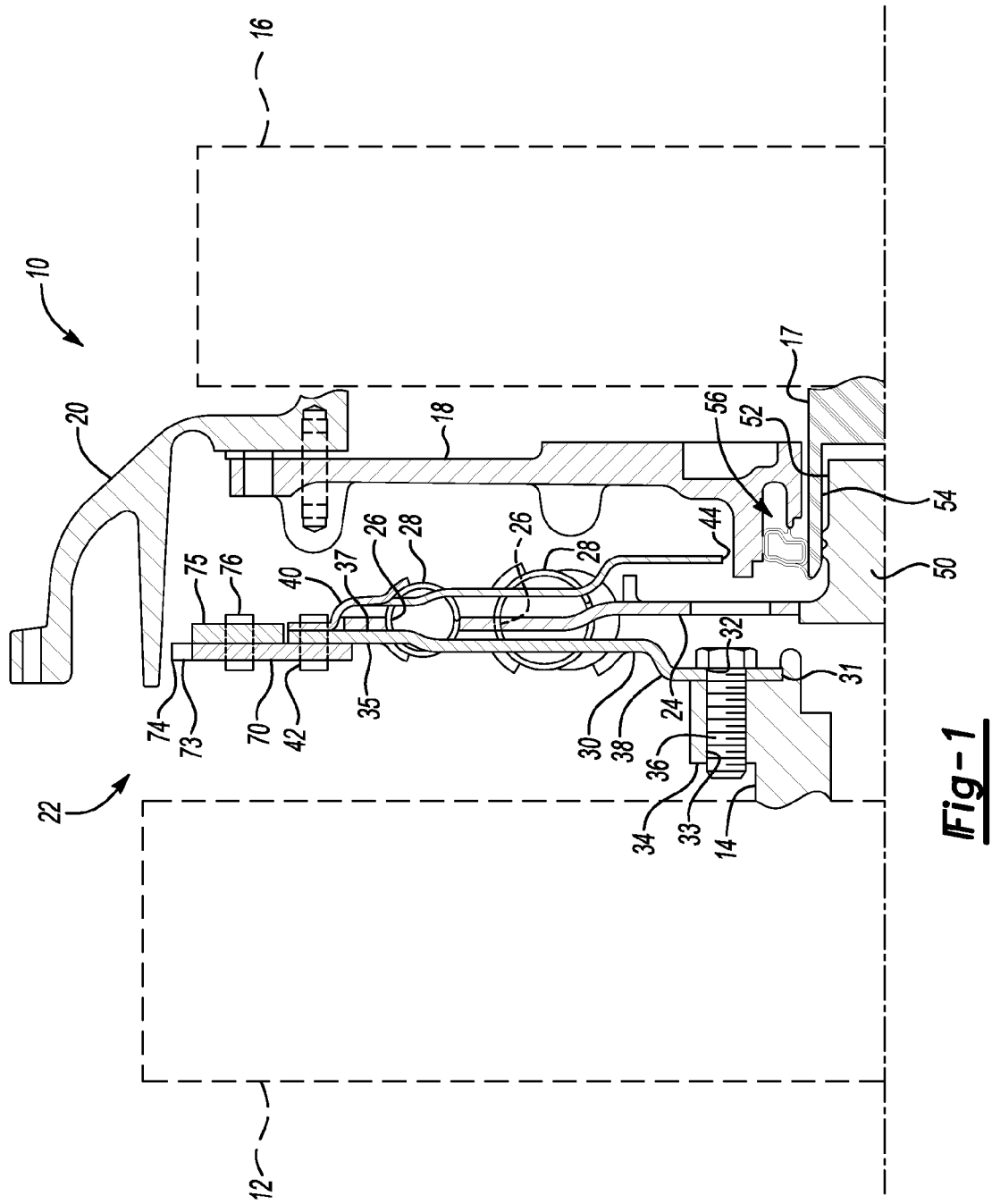
FIG. 1 is a schematic fragmentary cross-sectional illustration of a powertrain having a damper assembly connected between an engine and a transmission, taken at lines 1-1 in FIG. 2.

Referring to the drawings, wherein like reference numbers refer to like components throughout the several views, FIG. 1 shows a powertrain 10. The powertrain 10 includes an engine 12 indicated in general by the area represented by phantom lines and in fragmentary view by the engine crankshaft 14. The powertrain 10 also includes a transmission 16 indicated in general by the area represented by phantom lines, and in fragmentary view by the transmission input member 17. A portion of a transmission end cover 18 and a transmission casing 20 are also shown. One or more motor/generators, intermeshing gears, and selectively engagable torque-transmitting mechanisms may also be enclosed by the transmission casing 20, such that the transmission 16 is a hybrid transmission.

The engine 12 provides power to the transmission 16, and is connected to the transmission 16 though a damper assembly 22, as further described below. The damper assembly 22 reduces torsional vibrations caused by torque transferred from the engine 12 to the transmission 16. The damper assembly 22 is a "dry" damper assembly, without the presence of oil or fluid as in conventional torque converters with internal damper assemblies, that uses spring isolation between relevant components to dampen oscillations.

The damper assembly 22 includes a retaining member 24, also referred to as a flange. The retaining member 24 has a plurality of spring pockets 26 spaced at various radial distances around the retaining member 24. Resilient members 28, which in this damper assembly 22 are coil springs, are positioned in the spring pockets 26.

The damper assembly 22 has an engine-side cover plate 30 with a first side 35 that faces the engine 12 and a second side 37 that faces the transmission 16. The engine-side cover plate 30 may be stamped steel, or any other suitable component, and has a central opening 31 that fits over a portion of the crankshaft 14. A series of apertures 32 in the engine-side cover plate 30 align with apertures 33 (one shown) in a flange portion 34 of the crankshaft 14. A series of bolts 36, one shown, extend through the apertures 32 and apertures 33 to directly connect the engine-side cover plate 30 for common rotation with the crankshaft 14. The engine-side cover plate 30 extends slightly axially to form a hub portion 38 in order to be appropriately positioned for connection to the crankshaft 14. The damper assembly 22 has no flexplate, which is a component typically connected for resisting thrust load in a torque converter and used for starting the engine with its ring gear and a 12-Volt starter application. Because a flexplate is not used, the axial space occupied by the damper assembly 22 between the engine 12 and the transmission 16 is reduced.

The damper assembly 22 further includes a transmission-side cover plate 40 directly connected for common rotation with the engine-side cover plate 30 by rivets 42 or other types of fasteners. The transmission-side cover plate 40 has an inner annular opening 44 that clears the transmission end cover 18. Thus, the engine-side cover plate 30 and the transmission-side cover plate 40 rotate together commonly with the crankshaft 14.

The retaining member 24 is splined or otherwise secured for rotation with a hub portion, also referred to as a mounting shaft 50. The mounting shaft 50 has external splines 52 so that it can fit within and be secured to the internal splines 54 of the transmission input member 17. Sealing components 56 are positioned between the transmission cover plate 18 and the transmission input member 17.

Figure 2:
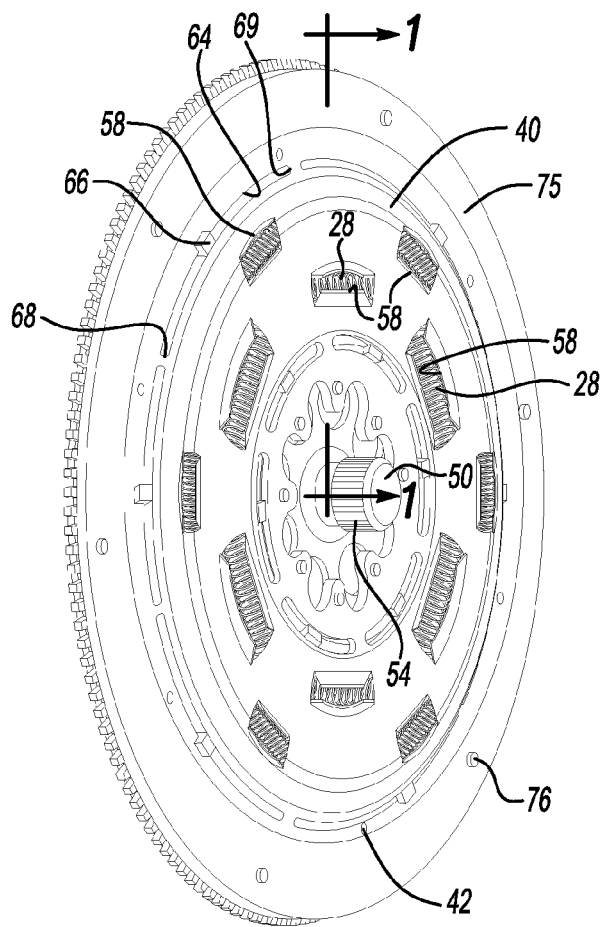
FIG. 2 is a perspective illustration of the damper assembly of FIG. 1, viewing the side of the damper assembly that faces the transmission.
Figure 3:
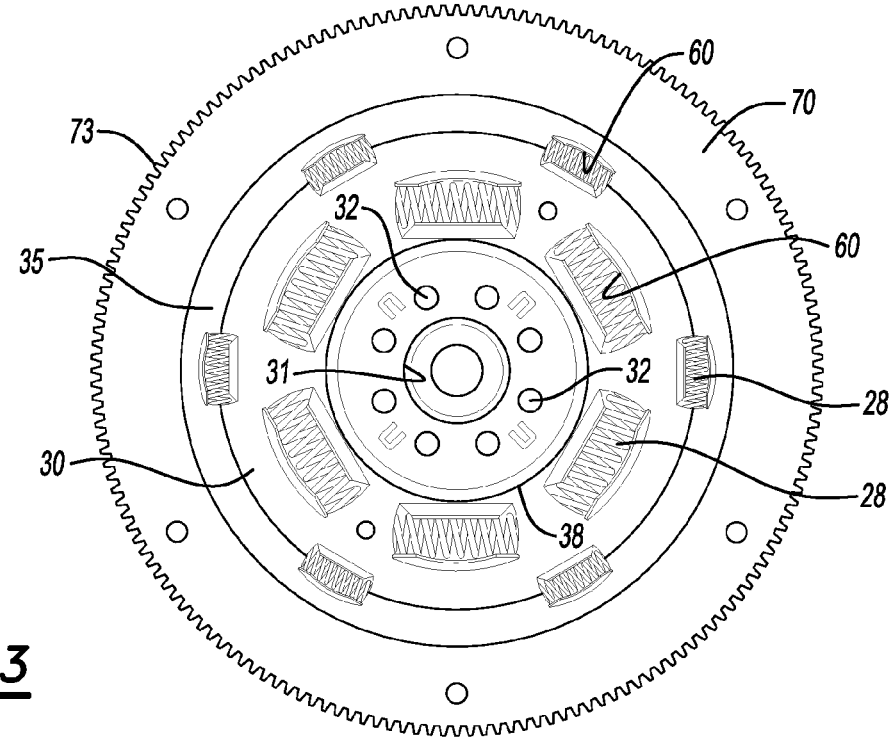
FIG. 3 is a perspective illustration of the damper assembly of FIGS. 1 and 2, viewing the side of the damper assembly that faces the engine.

The transmission-side cover plate 40 defines a plurality of spring pockets 58 through which the sides of the springs 28 partially extend, as shown in FIG. 2. The engine-side cover plate 30 also has spring pockets 60, as shown in FIG. 3, through which the springs 28 may partially extend when compressed. Referring again to FIG. 1, when torsional vibrations occur due to differences in rotational speed of the crankshaft 14 and the transmission input member 17, the engine-side cover plate 30 and the transmission-side cover plate 40 will rotate slightly relative to the retaining member 24. This places pressure on the springs 28 as the sides of the spring pockets 26 and 58 move closer together and compress the springs 28, causing the springs 28 to elastically deform. Thus, the springs 28 dampen vibrations between the engine 12 and the transmission 16. The springs 28 may be of varying sizes to provide multiple spring rates.

Referring to FIG. 2, arcuate slots 64 spaced circumferentially about the transmission-side face plate 40 receive tabs 66 extending from the retaining member 24. The tabs 66 move within the slots 64 when the springs 28 are compressing. The ends 68, 69 of the slots 64 limit movement of the tabs 66 to prevent inelastic deformation of the springs 28, i.e., deformation beyond their designed limitations.

Referring again to FIG. 1, a first generally-annular weighted member 70, also referred to as an inertia plate, is connected for common rotation with the engine-side cover plate 30 near an outer extremity of the engine-side cover plate 30 with the same rivets 42 used to also connect the engine-side cover plate 30 with the transmission-side cover plate 40. The first annular weighted-member 70 has teeth 73 at an outer periphery 74 that form a ring gear, as best shown in FIG. 3. The teeth 73 are engaged with a starter motor assembly (not shown) to allow the starter motor to crank the crankshaft 14 to start the engine 12.

A second weighted annular member 75 is riveted to the first generally-annular weighted member 70 using a series of rivets 76. The inertia of both weighted members 70, 75 acts on the engine-side cover plate 30. Because the ring gear is formed by teeth 73 on the first generally-annular weighted member 70, the teeth 73 may be as wide in the axial direction as the width of the first generally-annular weighted member 70. In other embodiments, the teeth may be formed by both the first generally-annular weighted member 70 and the second generally-annular weighted member 75, and thus may be even wider, or may be formed by only the second weighted member 75. Using the first generally-annular weighted member 70 and/or the second generally-annular weighted member 75 to form the teeth results in wider teeth, able to handle heavier torque loading, than if the teeth were formed by the relatively thin engine-side cover plate 30.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
    an engine having a crankshaft;
    a transmission having a transmission input member;
    a damper assembly having
        an engine-side cover plate having a first side facing the engine and a second side facing the transmission;
        a transmission-side cover plate facing the transmission and connected to the engine-side cover plate at the second side of the engine-side cover plate;
        a retaining member between the cover plates;
        a first generally-annular weighted member coaxial with the engine-side cover plate and the transmission-side cover plate and connected to the engine-side cover plate at the first side of the engine-side cover plate so that the first generally-annular weighted member, the engine-side cover plate and the transmission-side cover plate are stacked axially with the engine-side cover plate between the first generally-annular weighted member and the transmission-side cover plate;
        resilient members positioned between the engine-side cover plate and the transmission-side cover plate and supported by the retaining member; and
        a fastener extending through each of the first generally-annular weighted member, the engine-side cover plate and the transmission-side cover plate;
    wherein the engine-side cover plate is directly connected to the crankshaft for common rotation therewith.

2. The powertrain of claim 1, wherein the retaining member is connected for common rotation with the transmission input member.

3. The powertrain of claim 1, wherein the first generally-annular weighted member has teeth at an outer perimeter to form a ring gear.

4. The powertrain of claim 1, wherein the engine-side cover plate is a single, unitary stamped steel component.

5. The powertrain of claim 1, further comprising:
    a second generally-annular weighted member radially outward of the engine-side cover plate.

6. The powertrain of claim 1, wherein the fastener is a rivet.

7. The powertrain of claim 1, wherein the transmission-side cover plate has arcuate slots spaced circumferentially thereabout; wherein the retaining member has tabs extending therefrom and positioned in the slots so that ends of the slots limit movement of the tabs.

8. A damper assembly for reducing torsional vibrations between an engine and a transmission comprising:
    an engine-side cover plate having a first side facing the engine and a second side facing the transmission;
    a transmission-side cover plate facing the transmission and connected to the engine-side cover plate at the second side of the engine-side cover plate;
    a retaining member between the cover plates and connected for common rotation with the transmission input member;
    resilient members supported by the retaining member and extending through the transmission-side cover plate; and
    a first generally-annular weighted member coaxial with the engine-side cover plate and the transmission-side cover plate and connected to the engine-side cover plate at the first side of the engine-side cover plate so that the first generally-annular weighted member, the engine-side cover plate and the transmission-side cover plate are stacked axially with the engine-side cover plate between the first generally-annular weighted member and the transmission-side cover plate;
    a fastener extending through each of the first generally-annular weighted member, the engine-side cover plate and the transmission-side cover plate; and wherein the first generally-annular weighted member has an outer perimeter with teeth at the outer perimeter to form a ring gear.

9. The damper assembly of claim 8, wherein the engine-side cover plate is a single, unitary stamped steel component.

10. The damper assembly of claim 8, further comprising:
a second generally-annular weighted member operatively connected to the engine-side cover plate for common rotation therewith.

11. The damper assembly of claim 10, wherein the second generally-annular weighted member is directly connected to the first generally-annular weighted member.

12. The damper assembly of claim 8, wherein the fastener is a rivet.

13. The damper assembly of claim 8, wherein the transmission-side cover plate has arcuate slots spaced circumferentially thereabout; wherein the retaining member has tabs extending therefrom and positioned in the slots so that ends of the slots limit movement of the tabs.

14. A powertrain comprising:
an engine having a crankshaft;
a transmission having an input member;
a damper assembly having
   an engine-side cover plate having a first side facing the engine and a second side facing the transmission;
   a transmission-side cover plate facing the transmission and connected to the engine-side cover plate at the second side of the engine-side cover plate;
   a retaining member between the cover plates and connected for common rotation with the transmission input member;
   springs supported by the retaining member between the engine-side cover plate and to the transmission-side cover plate;
   wherein the engine-side cover plate is a single, unitary stamped steel component directly connected to the crankshaft for common rotation therewith;
   a first weighted member coaxial with the engine-side cover plate and the transmission-side cover plate and directly connected to the engine-side cover plate at the first side of the engine-side cover plate so that the first weighted member, the engine-side cover plate and the transmission-side cover plate are stacked axially with the engine-side cover plate between the first weighted member and the transmission-side cover plate;
   a fastener extending through each of the first weighted member, the engine-side cover plate and the transmission-side cover plate;
   a second weighted member directly connected to the first weighted member such that the first weighted member is between the engine and the second weighted member; and
   wherein at least one of the first and second weighted members is configured with teeth at an outer periphery to form a ring gear.

15. The powertrain of claim 14, wherein the fastener is a rivet.

16. The powertrain of claim 14, wherein the transmission-side cover plate has arcuate slots spaced circumferentially thereabout; wherein the retaining member has tabs extending therefrom and positioned in the slots so that ends of the slots limit movement of the tabs.

\* \* \* \* \*